United States Patent [19]

Royer

[11] 4,345,584

[45] Aug. 24, 1982

[54] SOLAR ENERGY SYSTEM

[76] Inventor: George R. Royer, 2137 Ragan Woods Dr., Toledo, Ohio 43614

[21] Appl. No.: 109,558

[22] Filed: Jan. 4, 1980

[51] Int. Cl.³ .................................................. F24J 3/02
[52] U.S. Cl. ..................................... 126/427; 126/417
[58] Field of Search ............... 126/415, 417, 451, 427, 126/432, 437, 450, 423, 424; 414/403

[56] References Cited

U.S. PATENT DOCUMENTS

| | | | |
|---|---|---|---|
| 1,014,972 | 1/1912 | Nichols | 126/438 |
| 4,082,080 | 4/1978 | Pittinger | 126/431 |
| 4,112,920 | 9/1978 | Hillman | 126/437 |

Primary Examiner—Samuel Scott
Assistant Examiner—Lee E. Barrett

[57] ABSTRACT

The invention is a solar energy apparatus based on the concept of large area solar radiation reception, comprising a plurality of individual solar receptors, each solar radiation receptor being a flat plate collector adapted to hold relatively shallow layer of water extending over the upper surface thereof. The individual receptors are each comprised of an upper radiation receiving surface adapted to absorb solar radiation. These receptor surfaces are adapted so that the solar heat absorbed is immediately transferred by convection and other means upwardly to the water layer reposed above this receptor surface. The supporting member for each receptor is a rigid member of horizontal disposition surrounded by a vertically extending perimeter which serves as a wall to contain the water upon the upper receptor surface. The water heated on each receptor surface is thence drained at appropriate intervals to a common receptacle and thereupon transferred to a superheating unit where it is further heated to create steam for ultimate conversion to mechanical energy and then electrical energy. In order to facilitate the drainage of warmed water from each of the receptors, one end of each receiving plate member is equipped with an exit funnel that communicates directly with the common receptacle. On the opposite end of each of the receptors are receiving means to add unwarmed water onto the receptor surface of the subsequent solar warming process.

3 Claims, 2 Drawing Figures

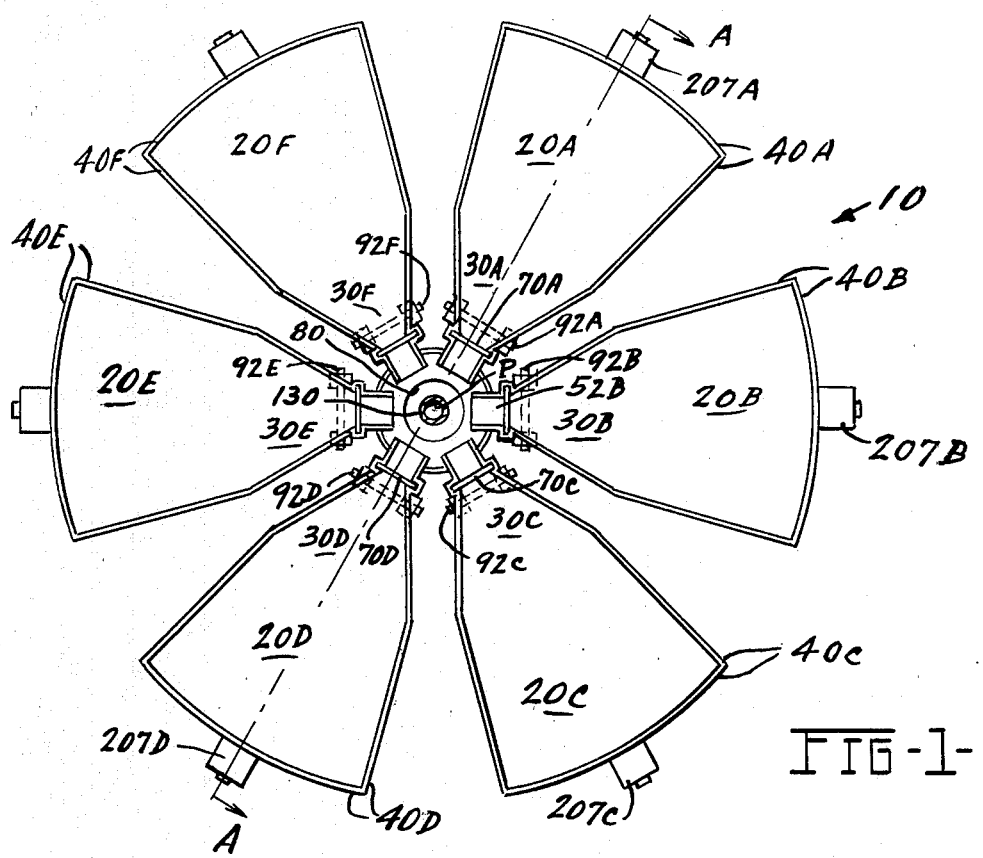
FIG-1-
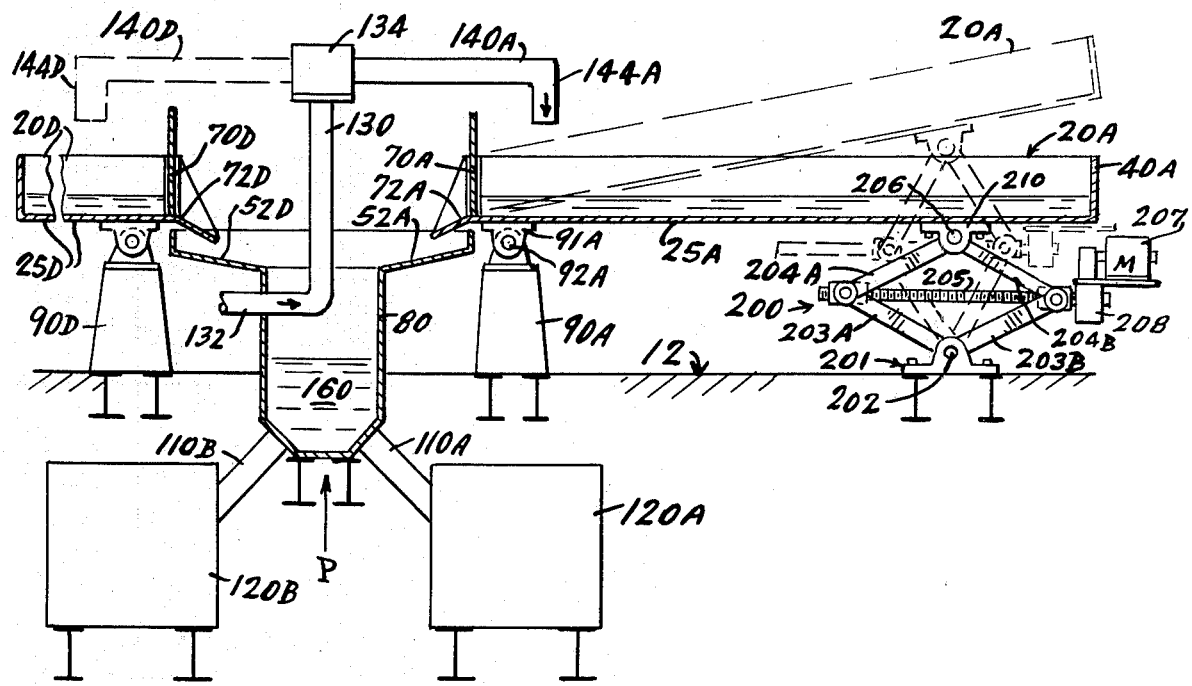
FIG-2-

SOLAR ENERGY SYSTEM

DISCUSSION OF PRIOR ART

The energy crisis now facing man, dictates the necessity and reality of using variant forms of energy to produce electricity, heat and other requirements. With the potential reduced availability of fossil fuels, particularly petroleum, there has been renewed emphasis on such diverse energy forms as wind, the sun, and hydroelectric power, among others. In this regard, solar energy devices of various types, while certainly not new in basic concept, have been conceived in various forms to achieve maximal utilization of the sun's radiation energy. This invention relates to an improved solar energy conversion system and corresponding apparatus for maximizing the total collection of energy over a given interval.

In the solar energy field one can readily surmise that the disadvantage with solar energy, under the present state of the art, is that a typical unit used for solar energy produces a quantity of total heat that is relatively insubstantial in amount to be of measurable value for commercial electrical power generation. A typical roof top unit will produce only about two thousand BTU's per hour and this is not sufficient to produce the necessary electrical power that one requires for electrical generation even on a small scale. Larger units obviously produce proportionately more BTU's, however, the limit on the potential size of the units restricts the total output over a given interval of a given solar energy receptor. Therefore, it can be seen that there is a requirement for greater total heat capture per unit if a viable and efficient power conversion system is desired. In this regard, one method is to capture more solar radiation over a wider receiving area, and this will yield more total heat capture. Thus, if the solar constant is 1.395 kilowatts per square meter per minute for a given area, a receiving surface of 100,000 square meters will yield approximately 139,500 kilowatts per hour, which if properly and efficiently drawn off can significantly generate a significant amount of electricity. The key factor therefore is to utilize a wide area receptor of relatively simple mechanical efficiency.

In analyzing the concept and problems associated with wide area reception, it must be stressed that solar energy is electromagnetic radiation which travels 186,000 miles per second and occupies the spectrum from about 0.25 micron to 3.0 microns in wavelength. Roughly nine percent of this radiation energy falls in the extremely short, and invisible, ultraviolet region; and about forty percent of this latter amount constitutes the visible light factor, while the remaining fifty-one percent is infrared, or the long waves. It is the latter radiation component that comprises the most significant and effective energy factor in this radiation process. As a direct consequence of the sun's fusion process, an appreciable amount of this infrared radiant energy falls on the earth at a given time. In this respect, it has been estimated that the average amount of the sun's energy reaching the earth's atmosphere, amounts to two calories per square centimeter per minute, or variously stated the mean value of the solar constant is 1.395 kilowatts per square meter. As can be determined while the amount of potential energy falling on a square meter, at a given time, is not substantial, a large receiving area taken in total can yield a significant energy capture. More specifically, in an overall perspective, it is known that the total radiation continuously intercepted by the earth's surface (an area of $1.273 \times 10^{14}$ square miles) is 1.73 C $10^{17}$ watts. This is approximately 173 trillion kilowatts, or 232 trillion horsepower continuously received by way of solar radiation. However, somewhere around thirty percent of the solar energy reaching the earth's atmosphere is immediately reflected back into space as short-wave radiation and a portion of this reflected energy is also capable of being captured along with the directly absorbed radiation. Approximately forty-seven percent is absorbed by the atmosphere, the land, and the oceans to contribute to the temperature of the environment, and this serves as the potential useful component for solar energy conversion.

As can be seen above, solar collectors can yield significant energy outputs so long as some means are utilized to collect solar energy dispersed over a wide area. In this latter regard, the ultimate test in solar energy utilization for a solar collector is how well it performs from a thermodynamic view. From a total energy collection standpoint, most of the solar energy collectors utilized are of the type referred to as flat plate collectors which yield from a thermodynamic aspect, moderate temperature increases but greater total energy output. In this latter type, the usual arrangement incorporates a black plate covered by a transparent cover plate with the cover plate spaced a distance of a few inches above the plate, to allow transfer of the sun's radiation therethrough. The plate material for the absorbing function is usually darkened material to maximize radiation absorption. The dark surface of the plate absorbs most of the sun's shortwave radiation and after being so absorbed, this energy is reradiated as longwave radiation. Since a glass enclosed plate is opaque to longwave radiation, the longwave radiation component is substantially retained in the enclosure, thereby helping to increase the total radiation heat absorbed in the collection. In this flat type plate of collection, the black plate, being a heat absorbor as mentioned, it collects heat and in turn heats a fluid, usually water or air, flowing immediately beneath its surface through an appropriate piping system. Contradistinguished from flat plate collectors are solar concentrators, which function mainly to achieve high temperature yields as a main purpose.

It is estimated that the efficiency range for such flat plate collectors ranges from forty percent to sixty percent for a thirty-degree Farenheit temperature rise, and a thirty percent efficiency rating for a one hundred degree Farenheit temperature increase. Obviously, such efficiency ranges are not satisfactory in view of the fact that in certain areas, sunlight does not cover the area much of the year. While specific devices have been used to improve these flat plate solar heaters, they are still highly inefficient, in part from a heat retention perspective, and in part from a total energy collection point of view, and the art requires a more efficient and effective methodology of collecting, retaining, and utilizing solar radiation in order to economically and successfully rely on solar heat.

As can be readily determined from the foregoing discussion of the prior art, it is not difficult to see the shortcomings of existing known solar energy devices from a practical economic standpoint in the area of total energy collection. On the one hand, the flat plate collector is capable of absorbing radiant energy over a more widely dispersed area, at low temperature gradients, while on the other hand, solar concentrators yield, at the expense of wide area dispersal, moderately high temperature increases over a very limited area, and this cannot produce significant energy collection for most practical purposes. Therefore, the subject invention is directed to that end of producing or yielding more total energy in a given system, as seen in the following description so that a greater total heat collection can be consummated for practical and commercial energy conversion purposes. This invention is directed to this end accordingly and the following objects of the subject invention are directed accordingly.

OBJECTS

It is an object of the subject invention to provide an improved solar energy collector;

Yet another object of the subject invention is to provide a solar energy collector that yields a greater total energy input;

It is also an object of the subject invention to provide a solar energy collector which yields greater total energy conversion;

It is another object of the subject invention to provide a solar energy receiver that improves the collection and retention of solar radiation energy;

Still another object of the subject invention is to provide a relatively more efficient solar energy conversion device;

A further object of the subject invention is to provide a device that maximizes solar energy reception;

Another object of the subject invention is to provide an improved flat plate solar energy collection system.

DRAWINGS

In the drawings:

FIG. 1 is a top elevational view of the overall solar energy receiving apparatus incorporating the subject invention.

FIG. 2 is a side elevational view partially in section of the solar energy receiving apparatus.

DESCRIPTION OF GENERAL EMBODIMENT

The subject invention is a solar energy conversion apparatus structured for relatively large area solar radiation reception for purposes of greater total energy collection and output for efficient practical or commercial energy conversion usage. The subject apparatus is generally comprised of one or more relatively large flat plate collection devices, with each of said individual devices being provided with a vertically disposed retaining wall around the entire perimeter thereof. Each such collecting device is therefore equipped to hold and retain over designated intervals, a given level of water or other fluid over the upper radiation absorbing surface, as enclosed by such retaining walls. Optionally disposed above the retained water level is a glass enclosure to capture a portion of the solar radiation not absorbed in the darkened collection surface. Moreover, each collecting device is provided with a drainage means on the one end, such drainage means being structured to draw off, in a relatively short duration and at an arbitrary interval, all water lying above the collector surface into a central collection receptacle for all such warmed water. Integrally structured on the underbelly of each collecting device is an elevating mechanism which is structured to lift upwardly the one end of such collecting device so as to facilitate and expedite the runoff of warmed surface water, into the central collection receptacle indicated above.

Situated in a centralized location convenient to all the exit drains for each such collecting device is the central collection receptacle, structured to receive all the solar warmed water periodically drained from each individual device. This collection receptacle, generally structured in the form of an insulated tank, leads in turn to a superheating system, the latter being primarily energized by other than solar means, such as coal, oil or nuclear power. This superheating system further increases the temperature of the warmed water received to a higher level. The superheater thus heats the solar-heated water to a temperature level sufficiently high to generate steam for purposes of driving a steam turbine, or other mechanical agency for ultimate conversion to other energy modes, such as electrical power.

Each of the several solar heating devices thus comprises a flat plate collector which is capable of temporarily holding a relatively shallow layer of water over its upper surface. As the darkened collector surface is heated, it will transfer a substantial portion of such received heat back to the water contained just above the collector surface. This heat is transferred back upwardly to such layer of water by means of radiation, convection and conductance. The retained shallow water layer, will thence be warmed to a moderately high temperature level. Once the water reaches a certain arbitrary designated temperature level, the elevating mechanism under each collection device is activated to lift the one end of the individual receiving device, and the drain is simultaneously opened, thereby causing the entire water content disposed over the collector device to be drained into the central collection receptacle. As indicated, several such flat plate collecting devices can be utilized concurrently. If several are used, each such collecting device can be timed to be emptied into the central collection reservoir in successively alternating intervals so that the central receptacle will be filled on a fairly continuous basis, with the degree of continuity depending proportionately on the number of such collecting devices. The process is repeated accordingly in similar fashion.

DESCRIPTION OF PREFERRED EMBODIMENT

Referring now to the drawings in which a preferred embodiment is shown; and particularly to FIGS. 1 and 2, a solar radiation collection system 10 is shown generally. Said solar energy collection system is basically and generally a flat plate collecting system being comprised of a plurality of such flat plate collection devices modified and adapted as described below. Thus, in general the invention herein envisions and encompasses a plurality of flat plate collection devices, each of substantially equal capacity, however, the invention herein is equally adaptable and operable with only one such flat plate collector, however, the greater the number of collectors utilized in the system 10, the more effective and efficient the system. Moreover, while a specific configuration for such individual flat plate collectors are set forth, the precise configuration is not of any essential consequence, so long as the collector has a relatively large area for solar energy collection, as described below.

Referring now in particular to FIG. 1, a top elevational view of the general collection system 10 is shown. Specifically, the general solar collection system 10 is comprised of a plurality of flat plate collecting devices 20A, 20B, 20C, 20D, 20E and 20F. There are six such flat plate collectors shown in the embodiment represented in FIG. 1, however, as noted, there can be any number of such flat plate collectors. It must be noted that with a larger number of clusters or number of these collectors, a greater continuity will result in the hot water feed system, as described below. Moreover, for geographic areas of more intense sunlight reception, fewer such receptacles will be needed in proportion to the degree of sunlight received. Conversely, in relatively less sunlight areas, the more such receptacles will be required. An optimal number of such receptacles will be considered to be five for most climates, however, experimentation is required for the purpose to determine the most suitable arrangement. The collectors 20A, 20B, 20C, 20D, 20E and 20F shown in FIG. 1 are generally of trapezoidal shape, with an elongated narrowed neck portion 30A, 30B, 30C, 30D, 30E and 30F, facing towards the center of the system. The precise planar shape of these collectors can vary from the trapezoidal shape, however. More specifically, the collectors 20A . . . 20F are preferably arranged in radial fashion with the narrowed neck portions 30A, 30B . . . 30F all directed towards the center as shown. Again, this radial arrangement is not considered critical, however such a radial arrangement is considered most optimal and appropriate for efficient space usage and centralization of the drain areas, as discussed below.

Each of the collectors 20A, 20B . . . 20F has vertically extending side walls around the perimeter. More specially, each such collector has a vertically extending boundary wall 40A, 40B . . . 40F, around the entire external periphery of each of the collectors 20A, 20B . . . 20F and said wall 40A thus serves to enclose the entire outer boundary of the collector 20A. Each other collector 20B . . . 20F has a similarly constructed enclosing wall 40B, 40C, 40D, 40E, and 40F, respectively, as shown in the drawings. As can be readily observed, each such retaining wall serves to provide a partially enclosed collecting container, exposing only the upper surface of each collector towards the sky. In the preferred embodiment, the height of each retaining wall, 40A, 40B . . . 40F, can be uniform all around the external periphery of each collector 20A, 20B . . . 20F, and by such constructional arrangement, each such collector can hold as a container a quantity of water the level of which necessarily is limited by the height of the retaining walls 40A, 40B . . . 40F. For purposes of practicing the preferred embodiment, it is desirable that the level of the average water level be around one to three inches on the plate collector. This water level may vary however, for this purpose, and the precise preferable water level of each collector surface will be determined by experience with the sunlight factor in a given area. Thus, in essence, as can be seen, each flat plate collector 20A, 20B . . . 20F, is a self-contained water holder, the capacity of which is determined by the area thereof multiplied by the height of the respective sidewalls 40A, 40B . . . 40F.

As seen in FIG. 2, each collector 20A, 20B . . . 20F is disposed about a central point P, in a radially symmetrical fashion wherein each such collector is preferably evenly spaced from another about such central point P. More specifically, the respective neck areas 30A, 30B . . . 30F of each such collector are disposed radially inwardly towards the common central point P. On the extreme radially inner end of each neck portion is a vertically slidable gate 70A, 70B . . . 70F, which gate serves to open and close an open zone in the radially inner extreme of vertical wall 40A, 40 . . . 40F. At the bottom of the open zone near the floor of the neck area 30A, 30B . . . 30F is a downwardly depending trough 72A, 72B . . . 72F on each collector respectively. Each of the downwardly depending troughs 72A, 72B . . . 72F lead on their lower extremes to a second but separate trough 52A, 52B . . . 52F, which latter trough leads on its bottom extreme to a centrally disposed common container 80, as shown. The common container 80 leads, in turn, on its bottom extremes to downwardly depending channels 110A and 110B which, in turn, feed superheater units 120A and 120B.

Each of the collectors 20A, 20B, 20C, 20D, 20E, and 20F are pivotally mounted on vertical support columns 90A, 90B, 90C, 90D, 90E and 90F respectively. More particularly, the radially inner ends of the respective collector members 20A, 20B . . . 20F are pivotally affixed on the bottom surface thereof to corresponding vertical columns 90A, 90B, 90C . . . 90F, as shown in FIG. 2. On the upper extreme of each such vertical column is a connecting pin 91A, 91B . . . 91F respectively, such pin being inserted through a mating bore in the pivotal mounting 92A, 92B . . . 92F integrally affixed on the bottom surface of each collector 20A, 20B . . . 20F, as represented in FIG. 2. With the aforesaid pivotal arrangement, as shown, each collector 20A, 20B . . . 20F is pivotally mounted so as to be pivotally movable relative to the vertical pillar 90A, 90B . . . 90F from a level horizontal position shown for collector 20A to the inclined position shown in phantom as 20A in FIG. 2. More specifically, the radially outer end of each collector 20A, 20B . . . 20F can be tilted upwardly a given distance about pivotal connection 92A, 92B . . . 92F. The precise extent to which the radially outer end of each collector is elevated is dependent on the length of the collector, with the most important consideration being the expeditious drainage of warmed water from the collector downwardly towards the radially inner end of the collector, and into the central collector 80. For this purpose, the amount of elevation that may be required to accomplish the drainage would be in the appropriate area of ten to thirty feet, however, this factor may vary significantly from installation to installation.

The process of raising the radially outer end of the collector 20A, 20B-20F is accomplished through elevating mechanism 200, shown in FIG. 2 as being integrally appended to the undersurface of the radially outer end of the collector. More particularly, the lifting apparatus shown in FIG. 2 is essentially a parallelogram structure pivotally mounted on base 201, which is in turn affixed to the ground 12. A pivot pin 202 is inserted through the upper portion of base 202, and which latter pivotal connection pivotally joins the lower ends of bottom opposing arms 203A and 203B. These latter bottom opposing arms 203A and 203B join, on their respective upper ends, the lower ends of the top arms 204A and 204B of the parallelogram structure. An intermediate horizontal arm 205 serves as a stabilizer between these respective top and bottom arms. The upper ends of the top arms 204A and 204B are joined at pivotal connection 206, which in turn is pivotally connected to support member 210 located on the undersurface of the collector near its radially outer end. A motor unit 207 joined to the lifting device 200 serves to move gearing 208 to actuate the lifting device. It must be stressed that the described structural features for lifting device 200 is not critical to the operation of the subject invention, as any lifting device can be used for this purpose.

When the lifting device 200 is actuated, the radially outer end of the collector 20A, 20B, 20C . . . 20F is elevated accordingly, lifting such end of the collector a sufficient distance in the air to drain the solar warmed water in the upper surface of the collector. As the elevating mechanism is actuated, the vertical gate 70A, 70B, 70C . . . 70F on the radially inner end of the collector is raised to expose the open gate on such radially inner end. As the solar warmed water, designated 160 in FIG. 2 is drained off the respective collector, it flows down over trough 72A, 72B . . . 72F onto trough 52A, 52B . . . 52F, and thence into common collector 80. This solar warmed water, indicated as 160 in FIG. 2, in collector 80, is thereupon passed through conduits 110A and 110B to superheater units 120A and 120B, schematically represented in the drawings. Super heater units 120A and 120B serve to heat the already solar heated water to an even higher temperature for purposes of creating steam which in turn is used to drive generating units, not shown. The superheater units can be fueled with conventional or nuclear fuels, as desired. The effectiveness of the subject invention in saving energy is commensurate to the degree of caloric input to the water that can be accomplished through the solar heating process. Thus, to the extent that the water on the collectors is heated that much proportional energy input will be saved in the process of generating the steam for energy conversion purposes. For example, if water at a temperature of twenty degrees centigrade is introduced onto the surface of the collectors for the subsequent solar heating process, and assuming that the sun heats the water to a uniform temperature of thirty degrees centigrade then, the caloric increase for one gram of the solar heated water would be increased by ten calories per gram of water. Consequently, ten calories per gram of the requested eighty calories would be saved in the heating process and thus one-eighth of the energy required to heat the water to vaporization level would be saved by use of the subject invention.

Once the generated steam is converted to mechanical energy for such purposes as electrical power generation, the resultant condensed water is pumped upwardly through intake 132 and through vertically disposed conduit 130 to a central dispersing container 134, which is elevated above the collectors. The central container in turn leads to horizontally disposed conduits 140A, 140B . . . 140F leading to a corresponding position above the collector surface. Exit opening 144A, 144B . . . 144F on each conduit 140A, 140B, . . . 140F is structured to empty directly above the collector surface accordingly. The cycle described above is repeated continuously during day light hours for energy conversion purposes.

I claim:

1. A solar heating apparatus comprising:
   (a) a longitudinally disposed solar heating collecting surface, disposed towards the sun, with an upper surface above and on undersurfaces thereunder;
   (b) retaining means on the upper surface of said collecting surface to retain water on the upper surface of said collecting surface for the purpose of solar heating of said retained water;
   (c) elevating means appended to one portion of the collecting surface, for elevation of that portion of the solar heating surface for facilitating drainage of solar heated water;
   (d) pivot means integrally appended to that portion of collecting surface which is longitudinally opposite to the end having the elevating means; whereby the collecting surface when elevated by said elevating means elevates the collecting surface in a tilted position about said pivot means, and downwardly towards said end where the pivot means is located;
   (e) exit means in said retaining means on said surface to allow drainage of the water off the collecting surface;
   (f) collecting means adjacent said exit means to collect solar heated water;
   (g) superheating means to superheat said solar heated water.

2. A solar heating apparatus using water as a heat absorption and transfer medium comprising:
   (a) a solar radiation collecting platform of generally horizontal disposition, said collecting platform having an upper and lower surface, and said collecting platform having an elevating end and a pivoting end;
   (b) retaining means on the upper surface of said collecting platform to retain, at various intervals, water levels on the upper surface of said collecting platform for solar heating said water;
   (c) exit means on said collector platform located adjacent the pivoting end of said collector platform for drainage of the solar heated water off the collecting platform at various intervals;
   (d) elevating means affixed to the elevating end of the collector platform for elevation of a portion of the collector platform for facilitating drainage of solar heated water off the upper surface of the collecting platform through said exit means at various intervals;
   (e) pivot means integrally affixed to the lower surface of said collecting platform, whereby the adjacent portion of the collecting platform pivots as the elevating means elevates other portions of the collecting platform, thereby tilting the collecting platform downwardly towards the pivoting end to facilitate water drainage from the collecting platform;
   (f) water receptacle means adjacent said collector platform to receive solar heated water from said exit means;
   (g) superheating means connected to said water receptacle means to superheat solar heated water received therein.

3. A solar heating apparatus using water as a heat transfer medium, said apparatus comprising:
   (a) a solar radiation collecting platform of generally horizontal disposition, said collecting platform having an upper surface and a lower surface, and said collecting platform having an elevating and a pivoting end;
   (b) retaining means on the upper surface of said collecting platform to retain water on the upper surface of said collecting surface at various intervals;
   (c) exit means in said retaining means located adjacent the pivoting end of said collecting platform, said exit means adapted to allow drainage of water from the upper surface of the collecting platform at various intervals;
   (d) elevating means affixed adjacent to the elevating end of the collecting platform for elevation of a portion of the collecting surface adjacent the elevating end of said collecting platform for facilitation of the drainage of any solar heated water from the upper surface of the collecting platform;

(e) pivot means integrally affixed to the lower surface of said collecting platform adjacent the pivoting end of said collecting platform to provide pivotable restraints on the pivoting end of the collecting platform whereby upon action of the elevating means to lift the elevating end of the collecting platform, the collecting platform tilts downwardly towards the pivoting end to facilitate the drainage of water off the upper surface of the collecting platform;

(f) water receptacle means adjacent said collector platform to receive solar heated water from said exit means;

(g) superheating means connected to said water receptacle means to superheat solar heated water received therein.

* * * * *